US012770908B2

(12) United States Patent
Sakitani et al.

(10) Patent No.: US 12,770,908 B2
(45) Date of Patent: Oct. 20, 2026

(54) NON-AQUEOUS ELECTROLYTIC SECONDARY BATTERY

(71) Applicant: SANYO Electric Co., Ltd., Kadoma (JP)

(72) Inventors: Nobuhiro Sakitani, Tokushima (JP); Takaharu Morikawa, Osaka (JP)

(73) Assignee: PANASONIC ENERGY CO., LTD., Osaka (JP)

(*) Notice: Subject to any disclaimer, the term of this patent is extended or adjusted under 35 U.S.C. 154(b) by 524 days.

(21) Appl. No.: 17/795,109

(22) PCT Filed: Jan. 22, 2021

(86) PCT No.: PCT/JP2021/002189
§ 371 (c)(1),
(2) Date: Jul. 25, 2022

(87) PCT Pub. No.: WO2021/153441
PCT Pub. Date: Aug. 5, 2021

(65) Prior Publication Data

US 2023/0073596 A1 Mar. 9, 2023

(30) Foreign Application Priority Data

Jan. 31, 2020 (JP) ................................ 2020-014767

(51) Int. Cl.
*H01M 10/04* (2006.01)
*H01M 4/02* (2006.01)
(Continued)

(52) U.S. Cl.
CPC ..... *H01M 10/0431* (2013.01); *H01M 4/0404* (2013.01); *H01M 4/386* (2013.01);
(Continued)

(58) Field of Classification Search
CPC .......... H01M 10/0431; H01M 4/0404; H01M 4/386; H01M 4/622; H01M 4/70; H01M 2004/021; H01M 2004/027
See application file for complete search history.

(56) References Cited

U.S. PATENT DOCUMENTS

2014/0050975 A1* 2/2014 Cha ........................ H01M 4/36
252/507
2016/0156031 A1* 6/2016 Kim ..................... C01B 33/029
429/218.1

(Continued)

FOREIGN PATENT DOCUMENTS

JP 2013-26072 A 2/2013
JP 2015-53129 A 3/2015

(Continued)

OTHER PUBLICATIONS

WO-2012042830-A1 Translation (Year: 2012).*

(Continued)

*Primary Examiner* — Matthew T Martin
*Assistant Examiner* — Kevin Song
(74) *Attorney, Agent, or Firm* — WHDA, LLP

(57) ABSTRACT

A negative electrode comprises a sheet-like negative current collector having a negative electrode mixture layer formed on a surface thereof, and includes a double-side coating, portion in which the negative electrode mixture layer is formed on both sides of the negative current collector, and a single-side coating portion in which the negative electrode mixture layer is formed on one side of the negative current collector. At least a part of the single-side coating portion is disposed at the outermost periphery of the electrode assembly. At least a part of an exposed surface of the negative current collector in the single-side coating portion is in contact with the inner surface of an outer can. The charge expansion ratio of the negative electrode mixture layer in the (Continued)

single-side coating portion is greater than the charge expansion ratio of the negative electrode mixture layer in the double-side coating portion.

5 Claims, 6 Drawing Sheets

(51) Int. Cl.

| | |
|---|---|
| ***H01M 4/04*** | (2006.01) |
| ***H01M 4/38*** | (2006.01) |
| ***H01M 4/62*** | (2006.01) |
| ***H01M 4/70*** | (2006.01) |
| ***H01M 50/46*** | (2021.01) |

(52) U.S. Cl.

CPC ............. *H01M 4/622* (2013.01); *H01M 4/70* (2013.01); *H01M 50/46* (2021.01); *H01M 2004/021* (2013.01); *H01M 2004/027* (2013.01)

(56) References Cited

U.S. PATENT DOCUMENTS

| | | | |
|---|---|---|---|
| 2018/0248220 | A1* | 8/2018 | Manabe |
| 2021/0257607 | A1 | 8/2021 | Takano et al. |

FOREIGN PATENT DOCUMENTS

| | | | | |
|---|---|---|---|---|
| WO | WO-2012042830 | A1 * | 4/2012 | .......... H01M 50/536 |
| WO | 2017/038041 | A1 | 3/2017 | |
| WO | 2017/122251 | A1 | 7/2017 | |
| WO | 2020/004135 | A1 | 1/2020 | |

OTHER PUBLICATIONS

International Search Report dated Apr. 20, 2021, issued in counterpart International Application No. PCT/JP2021/002189 (2 pages).

* cited by examiner

NON-AQUEOUS ELECTROLYTIC SECONDARY BATTERY

CROSS-REFERENCE TO RELATED APPLICATION

This application is a National Phase Application filed under 35 U.S.C. 8371 of International Application No. PCT/JP2021/002189 filed on Jan. 22, 2021 which claims the benefit of priority under 35 U.S.C. § 119 (a) of Japanese Patent Application No. 2020-014767 filed in Japan on Jan. 31, 2020, the contents of which are incorporated herein by reference.

TECHNICAL FIELD

The present disclosure generally relates to a non-aqueous electrolyte secondary battery.

BACKGROUND ART

Conventionally widely used is a non-aqueous electrolyte secondary battery comprising a wound electrode assembly in which a band-shaped positive electrode and a band-shaped negative electrode are wound with a separator interposed therebetween and an outer housing can that houses the wound electrode assembly. The electrodes of the electrode assembly (the positive electrode and the negative electrode) in such a wound battery have a mixture layer including an active material and a binder on both surfaces of each metallic current collector, and the positive electrode and the negative electrode are wound with the separator interposed therebetween. Typically, the separator is disposed on the outermost circumference of the electrode assembly, the positive electrode is connected to a sealing assembly, which is to be an external terminal on the positive electrode side, with a positive electrode lead, and the negative electrode is connected to the outer housing can, which is to be an external terminal on the negative electrode side, with a negative electrode lead. In a battery having such a constitution, since current from the band-shaped negative electrode concentrates at the negative electrode lead, an internal resistance is likely to be large.

Patent Literature 1 describes that a negative electrode is disposed on the outermost circumference of an electrode assembly, a negative electrode current collector is exposed as a one-surface coated portion eliminating a negative electrode mixture layer on a surface on the outermost circumference side at this position, and the negative electrode current collector is directly contacted with an inn face of an outer housing can to be electrically connected.

CITATION LIST

Patent Literature

Patent Literature 1: International Publication No. WO2012/042830

SUMMARY OF INVENTION

Technical Problem

When a clearance between the electrode assembly and the inner face of the outer housing can is narrowed in order to ensure contact of the exposed surface of the negative electrode current collector with the inner face of the outer housing can, insertion during the battery manufacturing is likely to fail, resulting in decreased productivity. Since the negative electrode mixture layer expands during charge, it is also considered to utilize this expansion during charge to strengthen the electrical connection between the negative electrode current collector and the inner face of the outer housing can. In this method, however, the negative electrode mixture layer significantly expands and contracts due to the charge and discharge, and deterioration due to the cycles, such as peeling between the active material and the current collector and isolating the active material which results in no contribution of the active material to the charge and discharge, is likely to be large.

The present disclosure provides a non-aqueous electrolyte secondary battery in which a charge expansion coefficient of the negative electrode mixture layer in a one surface coated portion, at least a part of which is disposed on the outermost circumference, is set to be large to inhibit the failure during assembly and deterioration with the charge-discharge cycle and to ensure the electrical connection between the exposed surface of the negative electrode current collector on the outermost circumference of the electrode assembly and the inner the of the outer housing can.

Solution to Problem

A non-aqueous electrolyte secondary battery of an aspect of the present disclosure is a non-aqueous electrolyte secondary battery, comprising: a wound electrode assembly in which a band-shaped positive electrode and a band-shaped negative electrode are wound with a separator interposed therebetween; and an outer housing can that houses the electrode assembly, wherein the positive electrode has a positive electrode mixture layer formed on a surface of a sheet-shaped positive electrode current collector, the negative electrode has a negative electrode mixture layer formed on a surface of a sheet-shaped negative electrode current collector, the negative electrode mixture layer includes a chargeable and dischargeable negative electrode active material and a binder, the negative electrode includes: a both surface coated portion in which the negative electrode mixture layer is formed on both surfaces of the negative electrode current collector: and a one-surface coated portion in which the negative electrode mixture layer is formed on one surface of the negative electrode current collector, at least a part of the one-surface coated portion is disposed on an outermost circumference of the electrode assembly, at least a part of an exposed surface of the negative electrode current collector in the one-surface coated portion is contacted with an inner face of the outer housing can, and a charge expansion coefficient of the negative electrode: mixture layer in the one-surface coated portion is larger than a charge expansion coefficient of the negative electrode mixture layer in the both-surface coated portion.

Advantageous Effect of Invention

The non-aqueous electrolyte secondary battery according to the present disclosure can achieve a clearance between the electrode assembly and the inner face of the outer housing can during assembly, and can reduce the charge expansion coefficient of the entire negative electrode mixture layer. Thus, the failure during assembly and deterioration due to the charge-discharge cycles can be inhibited, and a good electrical connection can be achieved between the exposed surface of the negative electrode current collector and the inner face of the outer housing can.

DESCRIPTION OF EMBODIMENTS

Hereinafter, an example of an embodiment of a cylindrical, wound non-aqueous electrolyte secondary battery according to the present disclosure will be described in detail with reference to the drawings. In the following description, specific shapes, materials, values, directions, and the like, which are examples for facilitating understanding of the present invention, may be appropriately modified with specifications of cylindrical secondary batteries. When a plurality of embodiments and modified examples are included in the following description, use in appropriate combination of characteristic portions thereof are anticipated in advance.

Entire Constitution

Figure 1:
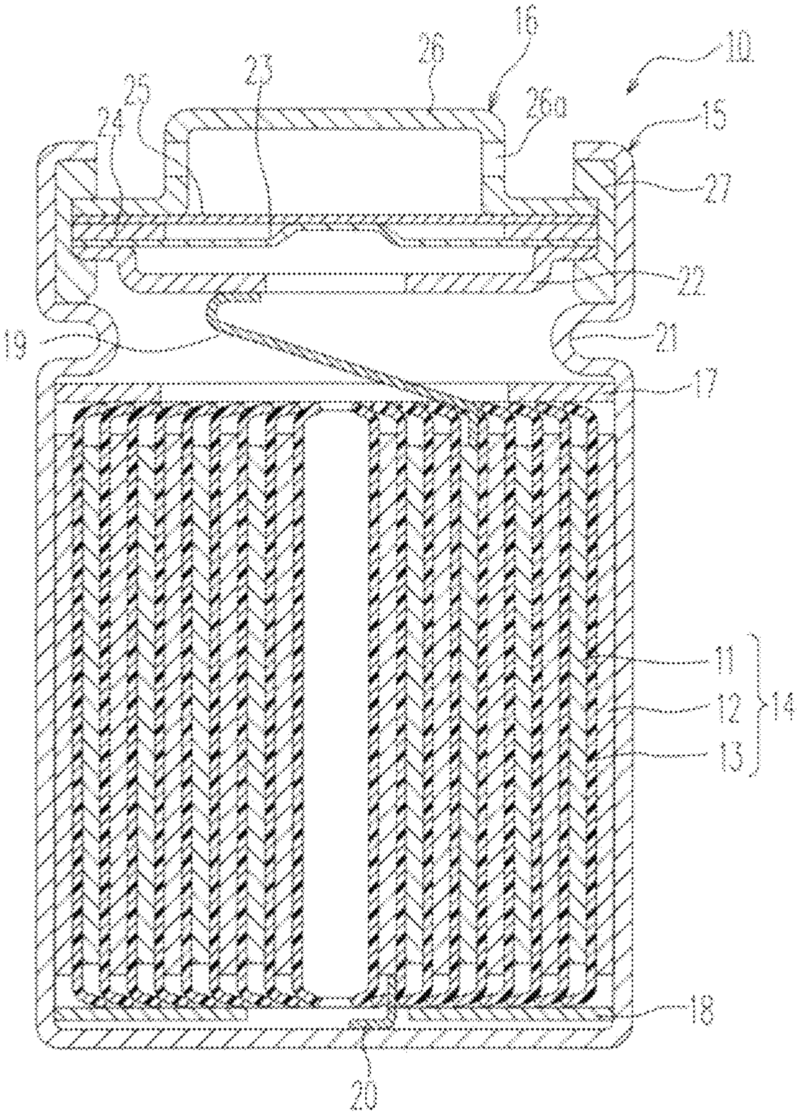
FIG. 1 is an axial sectional view of a cylindrical secondary battery of an example of an embodiment.

FIG. 1 is an axial sectional view of a wound secondary battery 10 of an example of an embodiment. Although the secondary battery 10 illustrated in FIG. 1 has a cylindrical shape, the secondary battery 10 may have a rectangular cylindrical shape or the like as long as it is the wound battery. In the secondary battery 10 illustrated in FIG. 1, an electrode assembly 14 and a non-aqueous electrolyte (not illustrated) are housed in an outer housing can 15. The electrode assembly 14 has a wound structure in which a positive electrode 11 and a negative electrode 12 are wound with a separator 13 interposed therebetween. For a non-aqueous solvent (organic solvent) of the non-aqueous electrolyte, carbonates, lactones, ethers, ketones, esters, and the like may be used, and two or more of these solves may be mixed to be used. When two or more solvents are mixed to be used, a mixed solvent including a cyclic carbonate and a linear carbonate is preferably used. For example, ethylene carbonate (EC), propylene carbonate (PC), butylene carbonate (BC), and the like may be used as the cyclic carbonate, and dimethyl carbonate (DMC), ethyl methyl carbonate (EMC), diethyl carbonate (DEC), and the like may be used as the linear carbonate. For an electrolyte salt of the non-aqueous electrolyte, $LiPF_6$, $LiBF_4$, $LiCF_3SO_3$, and the like, and a mixture thereof may be used. An amount of the electrolyte salt dissolved into the non-aqueous solvent may be set to be, for example, 0.5 to 2.0 mol/L. Hereinafter, for convenience of description, the sealing assembly 16 side will be described as "the upper side", and the bottom side of the outer housing can 15 will be described as "the lower side".

An opening end part of the outer housing can 15 is capped with a sealing assembly 16 to seal inside the secondary battery 10. Insulating plates 17 and 18 are provided on the upper and lower sides of the electrode assembly 14, respectively. A positive electrode lead 19 extends upward through a through hole of the insulating plate 17, and welded with the lower face of a filter 22, which is a bottom plate of the sealing assembly 16. In the secondary battery 10, a cap 26, which is a top plate of the sealing assembly 16 electrically connected to the filter 22, becomes a positive electrode terminal. Meanwhile, a negative electrode lead 20 extends through a through hole of the insulating plate 18 toward the bottom side of the outer housing can 15, and welded with a bottom inner face of the outer housing can 15. In the secondary battery 10, the outer housing can 15 becomes a negative electrode terminal.

As described later, a negative electrode current collector 40 in a one-surface coated portion 46 (see FIG. 4A and FIG. 4B) is exposed on the outermost circumference of the electrode assembly 14, and the exposed surface of this negative electrode current collector 40 is contacted with the inner face of the outer housing can 15 to electrically connect the negative electrode 12 and the outer housing can 15.

The outer housing can 15 is, for example, a bottomed cylindrical metallic outer housing can. A gasket 27 is provided between the outer housing can 15 and the sealing assembly 16 to electrically insulate the outer housing can 15 and the sealing assembly 16, and to achieve sealability inside the secondary battery 10. The outer horsing can 15 has a grooved part 21 formed by, for example, pressing the side part thereof from the outside to support the sealing assembly 16. The grooved part 21 is preferably formed circularly along the circumferential direction of the outer housing can 15, and supports the sealing assembly 16 with the upper face of the grooved part 21.

The sealing assembly 16 has the filter 22, a lower vent member 23, an insulating member 24, an upper vent member 25, and the cap 26 that are stacked in this order from the electrode assembly 14 side. Each member constituting the sealing assembly 16 has, for example, a disk shape or a ring shape, and each member except for the insulating member 24 is electrically connected each other. The lower vent member 23 and the upper vent member 25 are connected each other at each of central parts thereof, and the insulating member 24 is interposed between each of the circumferential parts thereof. If the internal pressure of the battery increases due to abnormal heat generation, for example, the lower vent member 23 breaks and thereby the upper vent member 25 expands toward the cap 26 side to be separated from the lower vent member 23, resulting in cutting off of an electrical connection between both the members. If the internal pressure further increases, the upper vent member 25 breaks, and gas is discharged through an opening 26*a* of the cap 26.

Constitution of Electrode Assembly

Figure 2:
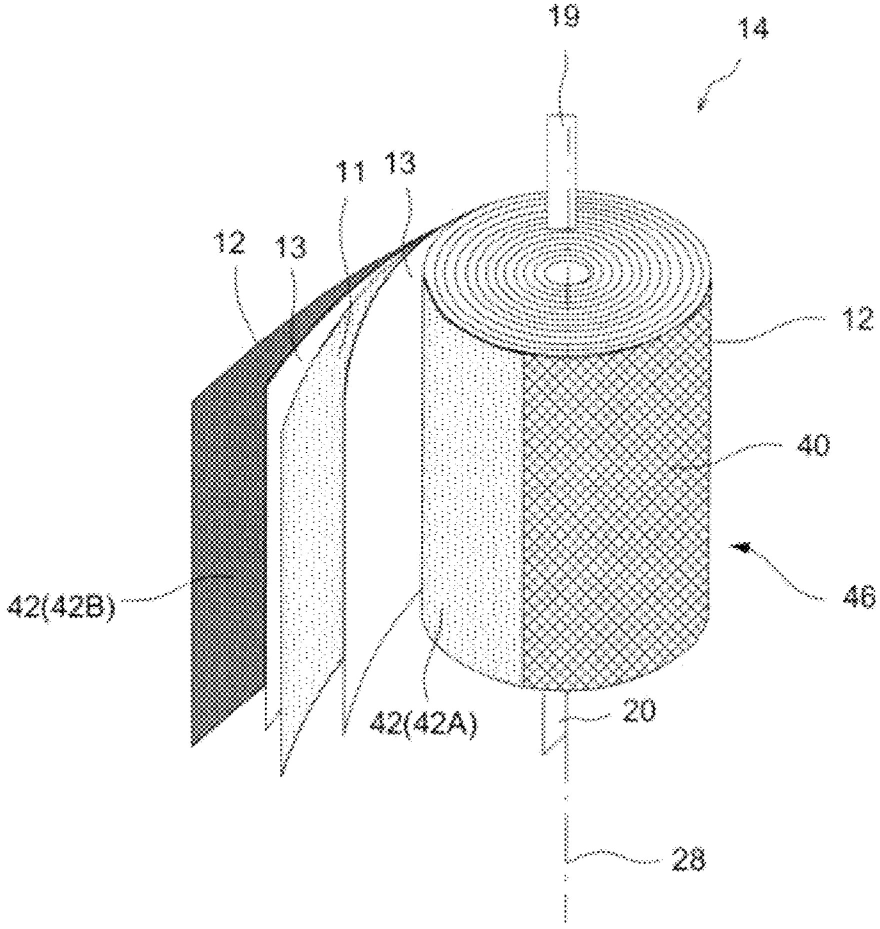
FIG. 2 is a perspective view of a wound electrode assembly comprised in the secondary battery illustrated in FIG. 1.

Next, the electrode assembly 14 will be described With reference to FIG. 2. FIG. 2 is a perspective view of the electrode assembly 14. As described above, the electrode assembly 14 has a wound structure in which the positive electrode 11 and the negative electrode 12 are spirally wound with the separator 13 interposed therebetween. Any of the positive electrode 11, the negative electrode 12, and the separator 13 is formed in a band shaped, and spirally wound around a winding core disposed along a winding axis 28 to be alternately stacked in the radial direction of the electrode assembly 14. In the radial direction, the winding axis 28 side is referred to as the inner peripheral side, and the opposite side thereof is referred to as the outer peripheral side. In the electrode assembly 14, the longitudinal direction of the positive electrode 11 and the negative electrode 12 becomes a winding direction, and the width direction of the positive electrode 11 and the negative electrode 12 becomes an axial direction. The positive electrode lead 19 extends, on the upper end of the electrode assembly 14 toward the axial direction, from a substantial center between the center and the outermost circumference in the radial direction. The negative electrode lead 20 extends, on the lower end of the electrode assembly 14, toward the axial direction from proximity of the winding axis 28.

For the separator 13, a porous sheet having an ion permeation property and an insulation property is used. Specific examples of the porous sheet include a fine porous thin film, a woven fabric, and a nonwoven fabric. As a material of the separator 13, olefin resins such as polyethylene and polypropylene are preferable. A thickness of the separator 13 is, for example, 10 μm to 50 μm. The separator 13 has tended to be thinned as higher capacity and higher output of the battery. The separator 13 has a melting point of, for example, approximately 130° C. to 180° C.

Constitution of Positive Electrode

Figure 3:
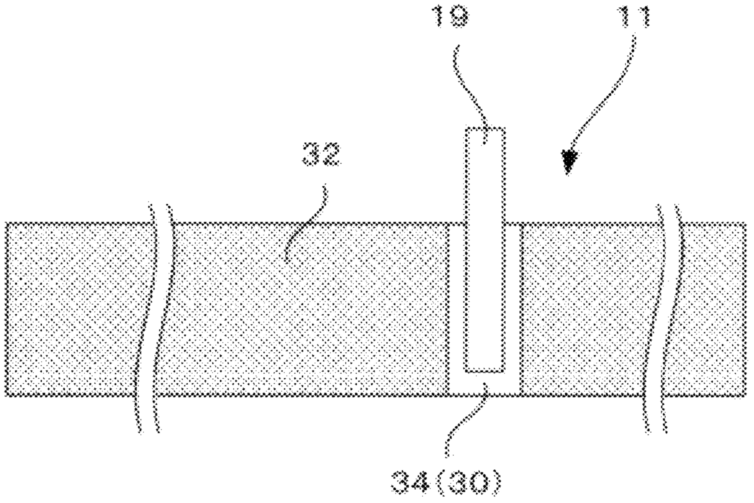
FIG. 3 is a front view of a positive electrode constituting an electrode assembly of an example of an embodiment illustrated with an unwound state.

Next, FIG. 3 is a front view of the positive electrode 11 constituting the electrode assembly 14 illustrated with an unwound state.

The positive electrode 11 has a band-shaped positive electrode current collector 30 and a positive electrode mixture layer 32 formed on the positive electrode current collector 30. The positive electrode mixture layer 32 is formed on at least one of the inner peripheral side and outer peripheral side of the positive electrode current collector 30. For the positive electrode current collector 30, a foil of a metal, such as aluminum, a film in which such a metal is disposed on a surface layer thereof, and the like are used, for example. A preferable positive electrode current collector 30 is a foil of metal mainly composed of aluminum or an aluminum alloy. A thickness of the positive electrode current collector 30 is, for example, 10 μm to 30 μm.

The positive electrode mixture layer 32 is preferably formed on an entire region of both surfaces of the positive electrode current collector 30 except for a positive electrode current collector exposed part 34, described later. The positive electrode mixture layer 32 preferably includes a positive electrode active material, a conductive agent, and a binder. The positive electrode mixture layer 32 is formed by applying a positive electrode mixture slurry including the positive electrode active material, the conductive agent, the binder, and a solvent such as N-methyl-2-pyrrolidone (NMP) on both the surfaces of the positive electrode current collector 30 and drying thereof (positive electrode mixture layer forming step). Then, the positive electrode mixture layer 32 is compressed.

Examples of the positive electrode active material may include a lithium-containing transition metal oxide containing a transition metal element such as Co, Mn, and Ni. The lithium-containing transition metal oxide is not particularly limited, and preferably a composite oxide represented by the general formula $Li_{1+x}MO_2$(in the formula, $-0.2<x\leq0.2$ and M includes at least one of Ni, Co, Mn, and Al).

Examples of the conductive agent included in the positive electrode mixture layer 32 may include carbon materials such as carbon black (CB), acetylene black (AB), Ketjenblack, and graphite.

Examples of the binder included in the positive electrode mixture layer 32 include fluororesins such as polytetrafluoroethylene (PTFE) and polyvinylidene fluoride (PVdF), polyacrylonitrile (PAN), a polyimide (PI), an acrylic resin, and a polyolefinic resin. When the positive electrode mixture slurry is prepared in an aqueous solvent, styrene-butadiene rubber (SBR), nitrile rubber (NBR), CMC or a salt thereof, polyacrylic acid or a salt thereof, polyvinyl alcohol, and the like may be used. The binder is preferably a rubber resin having a repeating molecular structure of double bonds and single bonds, such SBR and NBR, from a viewpoint of flexibility of the positive electrode 11. These materials may be used singly, or may be used in combination of two or more thereof. A content of the binder in the positive electrode mixture layer 32 is 0.5 mass % to 10 mass %, and preferably 1 mass % to 5 mass %.

On the positive electrode 11, the positive electrode current collector exposed part 34 in which a surface of the positive electrode current collector 30 is exposed is provided. The positive electrode current collector exposed part 34 is a portion to which the positive electrode lead 19 is connected and a portion in which a surface of the positive electrode current collector 30 is uncovered with the positive electrode mixture layer 32. The positive electrode current collector exposed part 34 is formed to be wider in the longitudinal direction than the positive electrode lead 19. The positive electrode current collector exposed part 34 is preferably provided on both surfaces of the positive electrode 11 to be stacked in the thickness direction of the positive electrode 11. The positive electrode lead 19 is joined to the positive electrode current collector exposed part 34 with, for example, ultrasonic welding.

In the example illustrated in FIG. 3, the positive electrode current collector exposed part 34 is provided on the central part in the longitudinal direction of the positive electrode 11 and over an entire length in the width direction. The positive electrode current collector exposed part 34 may be formed on the initial end part or terminal end part of the positive electrode 11, and is preferably provided at a position of substantially same distance from the initial end part and the terminal end part from a viewpoint of current collectibility. The positive electrode lead 19 connected to the positive electrode current collector exposed part 34 provides at such a position allows the positive electrode lead 19 to be disposed to project upward from the end surface in the width direction at a medial position in the radial direction of the electrode assembly 14 when wounded as the electrode assembly 14. The positive electrode current collector exposed part 34 is provided by, for example, intermittent application in which the positive electrode mixture slurry is not applied on a part of the positive electrode current collector 30.

Constitution of Negative Electrode

Figure 4A:
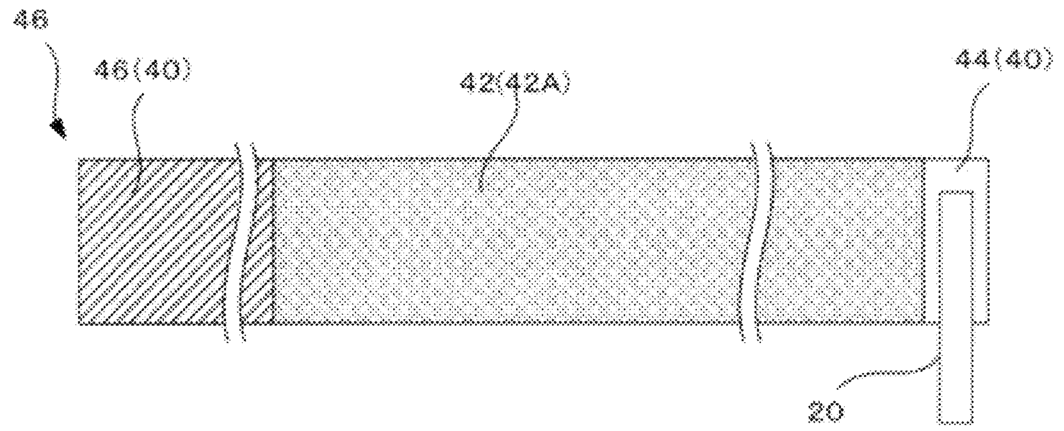
FIG. 4A is a front view of a negative electrode constituting an electrode assembly of an example of an embodiment illustrated with an unwound state.
Figure 4B:
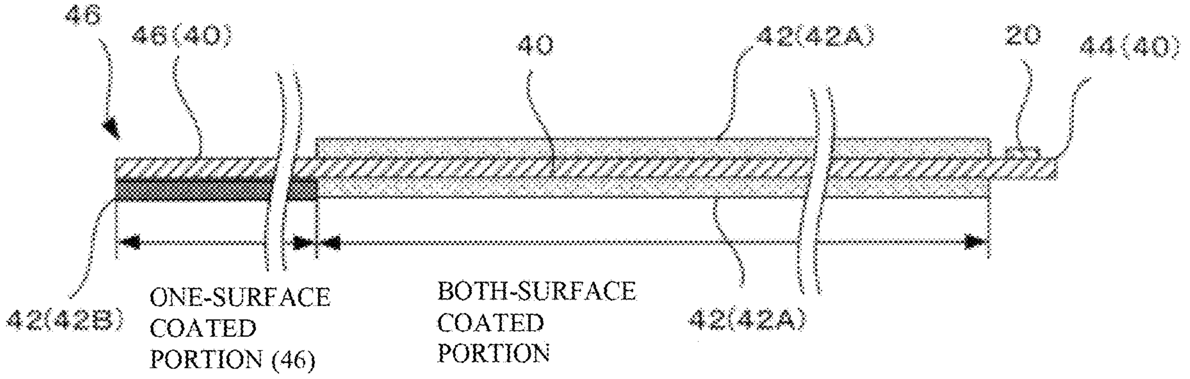
FIG. 4B is a longitudinal sectional view of a negative electrode constituting an electrode assembly of an example of an embodiment illustrated with an unwound state.

FIG. 4A is a front view of the negative electrode 12 constituting the electrode assembly 14 illustrated with an unwound state. FIG. 4B is a longitudinal sectional view of the negative electrode 12 constituting the electrode assembly 14 illustrated with an unwound state.

In the electrode assembly 14, the negative electrode 12 is formed to be larger than the positive electrode 11 to prevent precipitation of lithium on the negative electrode 12. In specific, a length in the width direction (axial direction) of the negative electrode 12 is larger than a length in the width direction of the positive electrode 11. In addition, a length in the longitudinal direction of the negative electrode 12 is larger than a length in the longitudinal direction of the positive electrode 11. As a result, at least a portion on which the positive electrode mixture layer 32 of the positive electrode 11 is formed is disposed opposite to a portion on which a negative electrode mixture layer 42 of the negative electrode 12 is formed with the separator 13 interposed therebetween when wound as the electrode assembly 14.

As illustrated in FIG. 4A and FIG. 4B, the negative electrode 12 has the band-shaped negative electrode current collector 40 and the negative electrode mixture layer 42 formed on both surfaces of the negative electrode current collector 40. For the negative electrode current collector 40, a foil of a metal such as copper, a film in which such a metal is disposed on a surface layer thereof, or the like is used, for example. A thickness of the negative electrode current collector 40 is, for example, 5 μm to 30 μm.

The negative electrode mixture layer 42 is preferably formed on an entire region of both the surfaces of the negative electrode current collector 40 except for a negative electrode current collector exposed part 44 and a one-surface coated portion 46, described later. The negative electrode mixture layer 42 preferably includes a negative electrode active material and a binder. The negative electrode mixture layer 42 is formed by applying a negative electrode mixture slurry including the negative electrode active material, the binder, and a solvent such as water on both the surfaces of the negative electrode current collector 40 to be dried (negative electrode mixture layer forming step). Then, the negative electrode mixture layer 42 is compressed.

In the examples illustrated in FIG. 4A and FIG. 4B, the negative electrode current collector exposed part 44 is provided on the initial end part in the longitudinal direction of the negative electrode 12 and over an entire length in the width direction of the current collector. The negative electrode current collector exposed part 44 is a portion to which the negative electrode lead 20 is connected and a portion in which a surface of the negative electrode current collector 40 is uncovered with the negative electrode mixture layer 42. The negative electrode current collector exposed part 44 is formed to be wider in the longitudinal direction than a width of the negative electrode lead 20. The negative electrode current collector exposed part 44 is preferably provided on both surfaces of the negative electrode 12 to be stacked in the thickness direction of the negative electrode 12.

In the present embodiment, the negative electrode lead 20 is joined to a surface on the inner peripheral side of the negative electrode current collector 40 with, far example, ultrasonic welding. One end part of the negative electrode lead 20 is disposed on the negative electrode current collector exposed part 44, and the other end part extends downward from the lower end of the negative electrode current collector exposed part 44. The negative electrode current collector exposed part 44 is provided by, for example, intermittent application in which the negative electrode mixture slurry is not applied on a part of the negative electrode current collector 40.

On a terminal end part of the negative electrode 12 disposed on the outermost circumference side of the electrode assembly 14, a one-surface coated portion 46 in which the negative electrode mixture layer 42 is formed only on one surface of the inner circumference side of the negative electrode current collector 40 is provided, and the negative electrode current collector 40 is exposed on a surface of the outer circumference side of the one-surface coated portion 46. In the negative electrode mixture layer 42 (42B) in the one-surface coated portion 46, a charge expansion coefficient is set to be larger than that in the negative electrode mixture layer 42 (42A) in the both-surface coated portion.

The negative electrode current collector 40 exposed in the one-surface coated portion 46 is contacted with the inner face of the outer housing can 15 (see FIG. 1), and separately to the negative electrode lead 20, the negative electrode 12 and the outer housing can 15 are electrically connected. The negative electrode current collector exposed part 44 and the one-surface coated portion 46 are preferably provided by, for example, intermittent application in which the negative electrode mixture slurry is not applied on a part of the negative electrode current collector 40.

The negative electrode active material is not particularly limited as long as it may reversibly occlude and release lithium (Li) ions, and for example, carbon materials such as natural graphite and artificial graphite, metals that form an alloy with lithium such as silicon (Si) and tin (Sn), or an alloy or oxide including them may be used.

Examples of the binder included in the negative electrode mixture layer 42 include fluororesins such as polytetrafluoroethylene (PTFE) and poly vinylidene fluoride (ME), polyacrylonitrile (PAN), a polyimide (PI), an acrylic resin, and a polyolefinic resin. When the negative electrode mixture slurry is prepared in an aqueous solvent, styrene-butadiene rubber (SBR), nitrile rubber (NBR), CMC or a salt thereof, polyacrylic acid or a salt thereof, polyvinyl alcohol, and the like may be used. The binder is preferably a rubber resin having a repeating molecular structure of double bonds and single bonds, such as SBR and NBR, from a viewpoint of flexibility of the negative electrode 12. These materials may be used singly, or may be used in combination of two or more thereof. A content of the binder in the negative electrode mixture layer 42 is 0.5 mass % to 10 mass %, and preferably 1 mass % to 5 mass %.

Constitution in Proximity of Outermost Circumference of Electrode Assembly

Figure 5:
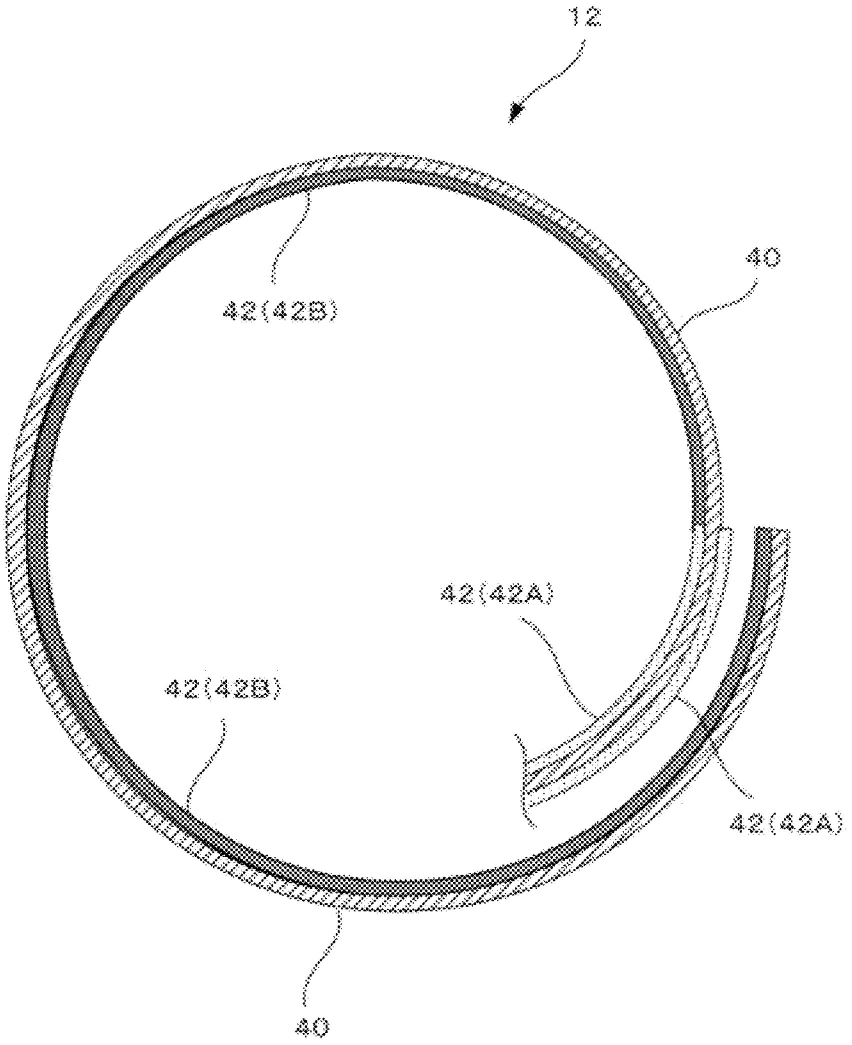
FIG. 5 is a radial sectional view (a cross section viewed from the axial direction) of a negative electrode in proximity of the outermost circumference of an electrode assembly of an example of an embodiment.

FIG. 5 is a radial sectional view (a, cross section viewed from the axial direction) of proximity of the outermost circumference of the negative electrode 12 (the positive electrode 11 and the separator 13 are omitted). As illustrated in FIG. 5, the negative electrode mixture layer 42 is absent on the outer circumference side of the negative electrode 12, which is of the outermost circumference, and the negative electrode current collector 40 is exposed.

Figure 6:
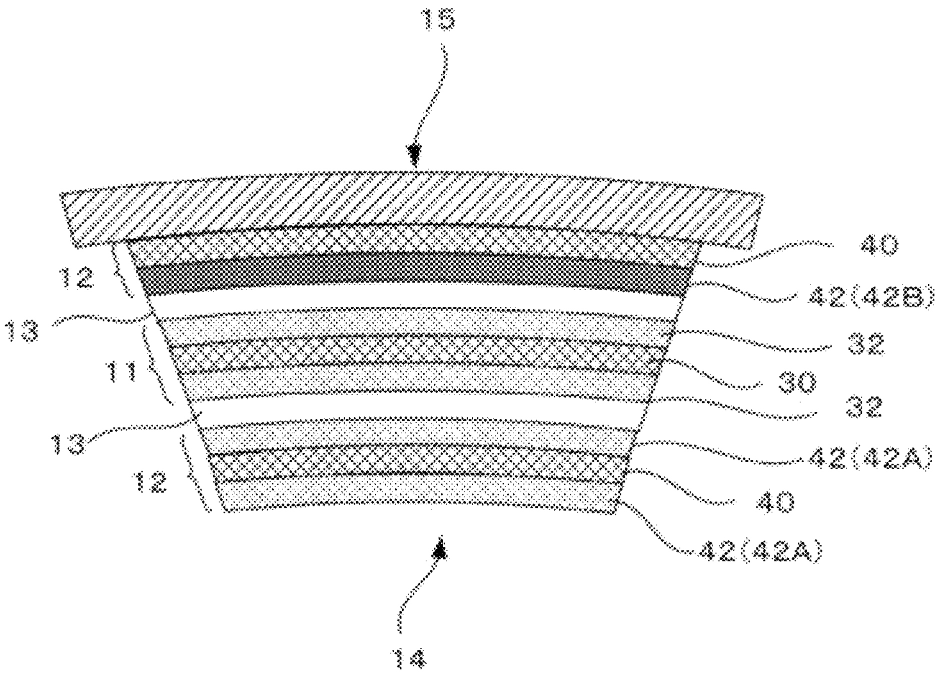
FIG. 6 is a radial sectional view (a cross section viewed from the axial direction) of a part of proximity of the outermost circumference of an electrode assembly of an example of an embodiment.

FIG. 6 is a radial sectional view (a cross section viewed from the axial direction) of a part of proximity of the outermost circumference of the electrode assembly 14. As illustrated the negative electrode 12 is positioned inside the outer housing can 15, the negative electrode current collector 40 is exposed on the outer circumference side of the negative electrode 12, and this exposed surface of the negative electrode current collector 40 is contacted with the inner face of the outer housing can 15. On the inner circumference side of the negative electrode 12, the positive electrode 11 in which the positive electrode mixture layer 32 is formed on both the side of the positive electrode current collector 30 is positioned with the separator 13 interposed therebetween. On the inner circumference side of the positive electrode 11, the negative electrode 12 is positioned with the separator 13 interposed therebetween.

The negative electrode mixture layer 42 (42B) in the one-surface coated portion 46 positioned on the outermost circumference of the electrode assembly 14 has a property different from the negative electrode mixture layer 42 (42A) in the both-surface coated portion on the inner circumference side. That is, in the negative electrode 12 of the non-aqueous electrolyte secondary battery of the present embodiment, the negative electrode mixture layer 42B in the one-surface coated portion 46 has a larger charge expansion coefficient than the negative electrode mixture layer 42A in the both-surface coated portion.

Charge Expansion Coefficient of Negative Electrode Mixture Layer

In the present embodiment, the charge expansion coefficient of the negative electrode mixture layer 42 (42B) in the one-surface coated portion 46 is set to be larger, and examples of the techniques therefor are as follows.

(1) Increasing the proportion of an active material having a large charge expansion coefficient.

(2) Increasing the particle diameter of an active material having a large charge expansion coefficient.

(3) Reducing the content the binder.

Examples of the negative electrode active material having a large charge expansion coefficient include a silicon material including Si and a tin material including Sn. The silicon material and the tin material are not essential, but the negative electrode mixture layer 42 (42B) preferably includes the silicon material it the present embodiment. Examples of the silicon material include Si, an oxide of Si, and lithium silicate. As the oxide of Si, a composite in which Si particles are dispersed in a $SiO_2$ phase may be used, for example. The silicon material is preferably used with the carbon material.

Increasing the charge expansion coefficient of the negative electrode mixture layer 42 (42B) in the one-surface coated portion 46 may allow the exposed surface of the negative electrode current collector 40 on the outermost circumference and the inner face of the outer housing can 15 to be certainly contacted with each other during charge to achieve good current collectibility without excessively narrowing the clearance between the electrode assembly 14 and the inner face of the outer housing can 15 during the insertion into outer housing can 15. Although the negative electrode mixture layer 42 contracts with discharge, initial expansion is large compared with contract thereafter. Therefore, an initial charge after the insertion of the electrode assembly 14 may allow the negative electrode current collector 40 on the outermost circumference to be contacted with the inner face of the outer housing can, and may maintain the good electrical contact with charge and discharge also thereafter.

In the present embodiment, the entire one-surface coated portion 46 is disposed on the outermost circumference of the electrode assembly 14, but the range where the one-surface coated portion 46 is disposed does not necessarily coincide with the outermost circumference of the electrode assembly 14. As long as at least a part of the one-surface coated portion 46 is disposed on the outermost circumference of the electrode assembly 14, at least a part of the exposed surface of the negative electrode current collector 40 may be sufficiently contacted with the inner face of the outer housing can. For example, the one-surface surface coated portion 46 is preferably disposed within a range of 50% or more of a circumference length of the outermost circumference of the electrode assembly 14. A part of the one-surface coated portion 46 may be disposed so as to extend toward the initial winding side from the outermost circumference of the electrode assembly 14. In this case, as illustrated in FIG. 6, the inner circumference side of the positive electrode mixture layer 32 is required to be opposite to the outer circumference side of the negative electrode mixture layer 42 with the separator 13 interposed therebetween, and thereby the one-surface coated portion 46 is formed from the terminal end part of the negative electrode 12 within a range not to exceed a position opposite to the terminal end of the inner face side of the positive electrode mixture layer 32. Accordingly, the range where the negative electrode mixture layer 42 (42B) in the one-surface coated portion 46 is opposed to the positive electrode mixture layer 32 is limited to one round or less, and thereby deterioration due to peeling between the active material and the current collector and due to isolation of the active material may be inhibited even with the increased charge expansion coefficient of the negative electrode mixture layer 42 (42B) in the one-surface coated portion 46.

This configuration may inhibit the failure during the insertion of the electrode assembly 14 into the outer housing can 15 and deterioration due to the charge-discharge cycles, and may allow the exposed surface of the negative electrode current collector 40 and the inner face of the outer housing can 15 to be certainly contacted with each other to achieve the good current collectability.

EXAMPLES

Hereinafter, the present disclosure will be further described with Examples, but the present disclosure is not limited to these Examples.

Production of Negative Electrode (Negative Electrode Slurry 1: Si Proportion 5.5 Mass %, Si Particle Diameter 5 μm)

Graphite and an oxide of Si were used as negative electrode active materials. Mixing of 94.5 parts by mass of graphite, 5.5 parts by mass of the oxide of Si having an average particle diameter of 5.0 μm, 1 part by mass of carboxymethylcellulose (CMC), and 1 part by mass of styrene-butadiene rubber (SBR), with water was performed to produce a negative electrode slurry 1. That is, a content of the binder (CMC and SBR) to the negative electrode active material in the negative electrode slurry 1 was 2 mass %. The Si proportion and Si particle diameter in the present disclosure mean a proportion and an average particle diameter in the negative electrode active material of the oxide of Si, respectively, and the average particle diameter is a median diameter (D50) on a volumetric basis.

(Negative Electrode Slurry 2: Si Proportion 20 Mass %, Si Particle Diameter 5 μm)

Mixing of 80.0 parts by mass of graphite, 20.0 parts by mass of an oxide of Si having an average particle diameter of 5.0 μm, 1 part by mass of carboxymethylcellulose (CMC), and 1 part by mass of styrene-butadiene rubber (SBR), with water was performed to produce a negative electrode slurry 2.

(Negative Electrode Slurry 3: Si Proportion 5.5 Mass %, Si Particle Diameter 1 μm)

The oxide of Si in the negative electrode slurry 1 was replaced with one having average particle diameter of 1 μm.

(Negative Electrode Shiny 4: Si Proportion 5.5 Mass %, Si Particle Diameter 15 μm)

The oxide of Si in the negative electrode slurry 1 was replaced with one having an average particle diameter of 15 μm.

(Negative Electrode Slurry 5: Si Proportion 5.5 Mass %, Si Particle Diameter 20 μm)

The oxide of Si in the negative electrode slurry 1 was replaced with one having an average particle diameter of 20 μm.

(Negative Electrode Slurry 6: Si Proportion 5.5 Mass %, Si Particle Diameter 5 μm, Binder 1.5 Mass %)

The amount of styrene-butadiene rubber (SBR) added in the negative electrode slurry 1 was changed to 0.5 parts by mass. That is, a content of the binder (CMC and SBR) to the negative electrode active material in the negative electrode slurry 6 was 1.5 mass %.

(Negative Electrode Application)

On a copper foil, two types of the negative electrode slurry for a both-surface coated portion and for a one-surface coated portion were applied by using a multilayer die coater with changing the negative electrode slurry depending on a portion to be coated. That is, the negative electrode shiny for the both-surface coated portion was applied on a part to be for the both-surface coated portion, and the negative electrode slurry for the one-surface coated portion was applied on a part to be for one-surface coated portion. Thereafter, the applied film was dried, the dried applied film was rolled, and then cut to a predetermined electrode plate size to produce a negative electrode.

Production of Positive Electrode

In an N-methylpyrrolidone (NMP) solvent, $LiNi_{0.8}Co_{0.15}Al_{0.05}O_2$ as a positive electrode active material, acetylene black, which is a carbon conductive agent, and polyvinylidene fluoride (PVDF) having an average molecular weight of 1.1 million were mixed at a mass ratio of 95:2.5:2.5 by using a mixer to prepare a positive electrode mixture slurry with a solid content of 70%. The prepared slurry was applied on both surfaces of an aluminum foil, dried, rolled, and then cut to a predetermined electrode plate size to produce a positive electrode plate.

Preparation of Electrolyte Liquid

Into 100 parts by mass of a mixed solvent of ethylene carbonate (EC) and dimethyl carbonate (DMC) (EC:DMC=1:3 at a volume ratio), 5 parts by mass of vinylene carbonate (VC) was added, and $LiPF_6$ as a lithium salt was dissolved at 1 mole/litter to prepare an electrolyte liquid as a non-aqueous electrolyte.

Production of Battery

Lead terminals were attached to each of the above positive electrode and the above negative electrode, and the electrodes were wound with a separator interposed therebetween to produce an electrode assembly. In this time, the one-surface coated portion of the negative electrode was disposed on the outermost circumference of the electrode assembly. The wound product was inserted into an outer housing can, which is a battery container, and the negative electrode lead was welded with a bottom of the container. Then, the positive electrode lead was ultrasonic-welded with a sealing assembly, the above electrolyte liquid was injected, and the sealing assembly was calked to seal the battery. A rated capacity of the produced battery is 2500 mAh.

Measurement of Direct-Current Resistance

The battery was charged at a constant current of 0.5 It until 4.2 V. The battery was further charged at a constant voltage of 4.2 V until a current reached 0.05 It. Then, the battery was discharged at a constant current of 0.2 It until a voltage reached 2.5 V to measure a discharge capacity.

A charging depth of the battery (State of Charge: SOC) was adjusted to 10% from the above result of the discharge capacity, and then the battery was discharged at a current of 1.0 It for 10 seconds to measure a change ire voltage ΔV at a time after the 10 seconds. From the change in voltage ΔV and the current value in the discharge, as direct-current resistance (DCR) was determined with the following formula. It is to be noted that It (A)=Rated Capacity (Ah) 1 (h).

$$DCR=\Delta V/1.0\ It$$

Measurement of Capacity Maintenance Rate

Charge and discharge under the same condition as in the above measurement method of the discharge capacity were performed with 100 cycles to calculate a capacity maintenance rate with the following formula.

Capacity Maintenance Rate=(Discharge Capacity at 100th Cycle Discharge Capacity at 1st Cycle)×100

Example 1

The slurry 1 was used as the slurry for the both-surface coated portion, and the slurry 2 was used as the slurry for the one-surface coated portion.

Comparative Example 1

The slurry 1 was used as the slurry for the both-surface coated portion and as the slurry for the one-surface coated portion.

Comparative Example 2

The slurry 2 was used as the slurry for the both-surface coated portion and as the slurry for the one-surface coated portion.

Example 2

The slurry 1 was used as the slurry for the both-surface coated portion, and the slurry 4 was used as the slurry for the one-surface coated portion.

Comparative Example 3

The slurry 4 was used as the slurry for the both-surface coated portion and as the slurry for the one-surface coated portion.

Example 3

The slurry 3 was used as the slurry for the both-surface coated portion, and the slurry 1 was used as the slurry for the one-surface coated portion.

Example 4

The slurry 4 was used as the slurry for the both-surface coated portion, and the slurry 5 was used as the slurry for the one-surface coated portion.

Example 5

The slurry 1 was used as the slurry for the both-surface coated portion, and the slurry 6 was used as the slurry for the one-surface coated portion.

Comparative Example 4

The slurry 6 was used as the slurry for the both-surface coated portion and as the slurry for the one-surface coated portion.

Experiment Result

Table 1 shows the DCR and capacity maintenance rate with changing the content proportions of the silicon material (Si proportions) in the negative electrode mixture layer 42A in the both surface coated portion disposed on the inner circumference side of the outermost circumference and in the negative electrode mixture layer 42B in the one-surface coated portion 46 disposed on the outermost circumference.

TABLE 1

| | Both-surface coated portion | | One-surface coated portion | | | Maintenance |
|---|---|---|---|---|---|---|
| | Si proportion | Si particle diameter | Si proportion | Si particle diameter | DCR | rate (100 cyc) |
| Example 1 | 5.5 mass % | 5 μm | 20.0 mass % | 5 μm | 62 mΩ | 92% |
| Comparative Example 1 | 5.5 mass % | 5 μm | 5.5 mass % | 5 μm | 105 mΩ | 95% |
| Comparative Example 2 | 20.0 mass % | 5 μm | 20.0 mass % | 5 μm | 53 mΩ | 80% |

In Example 1, the DCR is largely reduced compared with Comparative Example 1. As above, increasing the Si proportion of the one-surface coated portion 46 disposed on the outermost circumference reduces the DCR. Example 1 exhibits the capacity maintenance rate similar to that in Comparative Example 1, but in Comparative Example 2, the capacity maintenance rate is lowered compared with Comparative Example 1, although the DCR is largely reduced. That is, setting the Si proportion of the one-surface coated portion 46 to be larger than that of the both-surface coated portion can inhibit lowering of the capacity maintenance rate and can reduce the DCR.

Table 2 shows the DCR and capacity maintenance rate with changing the average particle diameters of the silicon material (Si particle diameters) in the negative electrode mixture layer 42A in the both-surface coated portion disposed on the inner circumference side of the outermost circumference and in the negative electrode mixture layer 42B in the one-surface coated portion 46 disposed on the outermost circumference.

TABLE 2

| | Both-surface coated portion | | One-surface coated portion | | | Maintenance |
|---|---|---|---|---|---|---|
| | Si proportion | Si particle diameter | Si proportion | Si particle diameter | DCR | rate (100 cyc) |
| Example 2 | 5.5 mass % | 5 μm | 5.5 mass % | 15 μm | 69 mΩ | 93% |
| Comparative Example 1 | 5.5 mass % | 5 μm | 5.5 mass % | 5 μm | 105 mΩ | 95% |
| Comparative Example 3 | 5.5 mass % | 15 μm | 5.5 mass % | 15 μm | 65 mΩ | 83% |
| Example 3 | 5.5 mass % | 1 μm | 5.5 mass % | 5 μm | 73 mΩ | 94% |
| Example 4 | 5.5 mass % | 15 μm | 5.5 mass % | 20 μm | 54 mΩ | 82% |

In Example 2, the DCR is largely reduced compared with Comparative Example 1. As above, increasing the Si particle diameter of the one-surface coated portion 46 disposed on the outermost circumference reduces the DCR. Example 2 exhibits the capacity maintenance rate similar to that in Comparative Example 1, but in Comparative Example 3, the capacity maintenance rate is lowered compared with Comparative Example 1, although the DCR is largely reduced. That is, setting the Si particle diameter of the one-surface coated portion 46 to be larger than that of the both-surface coated portion can inhibit lowering of the capacity maintenance rate and can reduce the DCR.

Table 3 shows the DCR and capacity maintenance rate with changing the contents of the binder in the negative electrode mixture layer 42A in the both-surface coated portion disposed on the inner circumference side of the outermost circumference and in the negative electrode mixture layer 42B disposed on the outermost circumference.

TABLE 3

| | Content of binder | | | Maintenance |
|---|---|---|---|---|
| | Both-surface coated portion | One-surface coated portion | DCR | rate (100 cyc) |
| Example 5 | 2.0 mass % | 1.5 mass % | 67 mΩ | 91% |
| Comparative Example 1 | 2.0 mass % | 2.0 mass % | 105 mΩ | 95% |
| Comparative Example 4 | 1.5 mass % | 1.5 mass % | 65 mΩ | 81% |

In Example 5, the DCR is largely reduced compared with Comparative Example 1. As above, increasing the content of the hinder in the one-surface coated portion 46 disposed on the outermost circumference reduces the DCR. Example 5 exhibits the capacity maintenance rate similar to that in Comparative Example 1, but in Comparative Example 4, the capacity maintenance rate is largely lowered compared with Comparative Example 1, although the DCR is largely reduced. That is, setting the content of the binder in the one-surface coated portion 46 to be larger than that of the both-surface coated portion can inhibit lowering of the capacity maintenance rate and can reduce the DCR.

Result

From the above, it is found that lowering of the capacity maintenance rate can be inhibited and the DCR can be reduced when the charge expansion coefficient of the negative electrode mixture layer 42 (42B) in the one-surface coated portion 46 disposed on the outermost circumference is set to be larger than that in the both-surface coated portion disposed on the inner circumference side of the outermost circumference.

REFERENCE SIGNS LIST

10 SECONDARY BATTERY, 11 POSITIVE ELECTRODE, 12 NEGATIVE ELECTRODE, 13 SEPARATOR, 14 ELECTRODE ASSEMBLY, 15 OUTER HOUSING CAN, 16 SEALING ASSEMBLY, 17, 18 INSULATING PLATE, 19 POSITIVE ELECTRODE LEAD, 20 NEGATIVE ELECTRODE LEAD, 21 GROOVED PART, 22 FILTER, 23 LOWER VENT MEMBER, 24 INSULATING MEMBER, 25 UPPER VENT MEMBER, 26 CAP, **26*a* OPENING, 27 GASKET, 28 WINDING AXIS, 30 POSITIVE ELECTRODE CURRENT COLLECTOR, 32 POSITIVE ELECTRODE MIXTURE LAYER, 34 POSITIVE ELECTRODE CURRENT COLLECTOR EXPOSED PART, 40 NEGATIVE ELECTRODE CURRENT COLLECTOR, 42 NEGATIVE ELECTRODE MIXTURE LAYER, 44 NEGATIVE ELECTRODE CURRENT COLLECTOR EXPOSED PART, 46** ONE-SURFACE COATED PORTION

The invention claimed is:

1. A non-aqueous electrolyte secondary battery, comprising:

a wound electrode assembly in which a band-shaped positive electrode and a band-shaped negative electrode are wound with a separator interposed therebetween; and an outer housing can that houses the electrode assembly, wherein the positive electrode has a positive electrode mixture layer formed on a surface of a sheet-shaped positive electrode current collector, the negative electrode includes a sheet-shaped negative electrode current collector having first and second side surfaces, the negative electrode has a negative electrode mixture layer formed on a surface the first and second side surfaces of the sheet-shaped negative electrode current collector, the negative electrode mixture layer includes a first negative electrode mixture layer and a second negative electrode mixture layer, the negative electrode mixture layer includes a chargeable and dischargeable negative electrode active material and a binder, the negative electrode includes a both-surface coated portion in which the first negative electrode mixture layer is formed on both the first and second side surfaces of the negative electrode current collector and a one-surface coated portion in which the second negative electrode mixture layer is formed on one of the first and second side surfaces of the negative electrode current collector, at least a part of the one-surface coated portion is disposed on an outermost circumference of the electrode assembly, the one-surface coated portion is disposed within a range of 50% or more of a circumference length of the outermost circumference of the electrode assembly, at least a part of an exposed surface of the negative electrode current collector in the one-surface coated portion is directly contacted with an inner face of the outer housing can, and a second charge expansion coefficient of the second negative electrode mixture layer in the one-surface coated portion is larger than a first charge expansion coefficient of the first negative electrode mixture layer in the both-surface coated portion.

2. The non-aqueous electrolyte secondary battery according to claim 1, wherein the negative electrode mixture layer includes a silicon material as the negative electrode active material, and a proportion of the silicon material to the negative electrode active material in the second negative electrode mixture layer of the one-surface coated portion is larger than a proportion of the silicon material to the negative electrode active material in the first negative electrode mixture layer of the both-surface coated portion.

3. The non-aqueous electrolyte secondary battery according to claim 1, wherein the negative electrode mixture layer includes a silicon material as the negative electrode active material, and a second average particle diameter of the silicon material in the second negative electrode mixture layer of the one-surface coated portion is larger than a first average particle diameter of the silicon material in the first negative electrode mixture layer of the both-surface coated portion.

4. The non-aqueous electrolyte secondary battery according to claim 1, wherein a second content of the binder in the second negative electrode mixture layer of the one-surface coated portion is lower than a first content of the binder in the first negative electrode mixture layer of the both-surface coated portion.

5. The non-aqueous electrolyte secondary battery according to claim 1, wherein:

the second negative electrode mixture layer is formed on the first side surface of the negative electrode current collector, and the second negative electrode mixture layer and the first negative electrode mixture layer on the first side surface lie in a common first plane in a unwound state, or the second negative electrode mixture layer is formed on the second side surface of the negative electrode current collector, and the second negative electrode mixture layer and the first negative electrode mixture layer on the second side surface lie in a common second plane in the unwound state.

* * * * *